Figure 1:
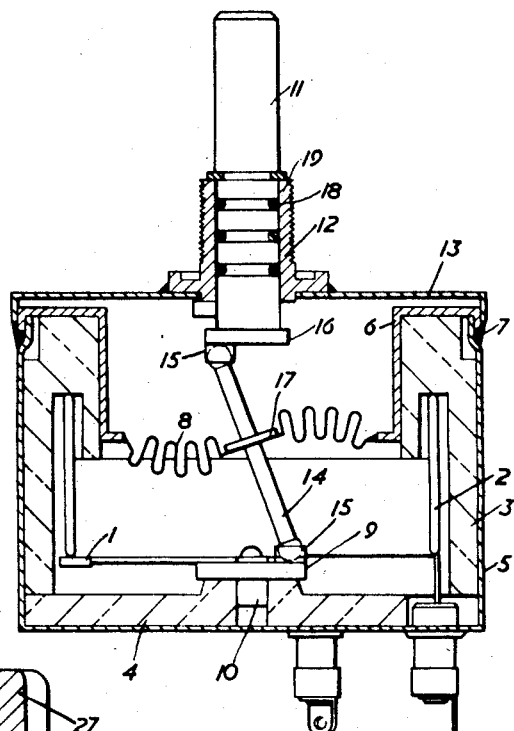

Feb. 17, 1959   L. W. D. SHARP ET AL   2,874,253
SWASH-PLATE POTENTIOMETER DRIVE
Filed Feb. 13, 1957   2 Sheets-Sheet 1

United States Patent Office 2,874,253
Patented Feb. 17, 1959

2,874,253

SWASH-PLATE POTENTIOMETER DRIVE

Leonard William Descarrieres Sharp, North Chingford, and Dennis Jack Blight, Woodford Green, England, assignors to The Plessey Company Limited, Ilford, England, a British company Application February 13, 1957, Serial No. 640,043

Claims priority, application Great Britain February 16, 1956

2 Claims. (Cl. 201—48)

This invention has for an object to provide means by which rotary adjustments can be transmitted from an actuating element to an element to be actuated which is required to be sealed in a fluid-tight manner from the actuating element. This problem arises for example when an adjustable resistor or potentiometer is required to work in a neutral or inert atmosphere.

It is sometimes necessary to interpose a fluid-tight partition between an actuating element and an element to be actuated. The presence of the fluid-tight partition raises a number of problems, one of which is how to transmit setting movements of the actuating element, which movements are usually rotary, to the element to be actuated, via the partition without interfering with, or reducing, the effectiveness of the fluid-tight partition. One solution of this problem has been to provide a flexible bellows as a part of the partition. The rotary movements of the actuating element are initially converted to linear movements. These linear movements are applied to one side of the bellows which will move in accordance with the linear movements. The other side of the bellows is connected with means for converting the linear movements of the bellows into rotary movements which latter are used to adjust the setting of the element to be actuated.

The present invention has for a more specific object to avoid the necessity of converting the rotary displacements of the actuating member into linear movements.

According to the invention the movement of an element which is rotatable about an axis is transmitted to a second element, rotatable co-axially therewith and separated from the first element by a fluid-tight partition, by a substantially rigid coupling member which extends from a point on the first element to a more or less diametrically opposite point on the second element, the thrust member being freely rotatable about its axis relative to each of said elements and being fixed in a fluid-tight manner in a flexible membrane or bellows forming part of the fluid-tight partition.

Since mutual rotary displacement of the two elements would involve alteration of the length of the coupling member, the two elements will be forced to rotate in substantial conformity without requiring rotation of the coupling member relative to the diaphragm or bellows.

Since a central point of the thrust rod will remain stationary whenever the actuated element moves in unison with the actuating element, a ball joint or similarly flexible means may be arranged at this point for preventing its movement transversely to the common axis of rotation of the two elements, while the seal is effected by the diaphragm.

Figure 2:
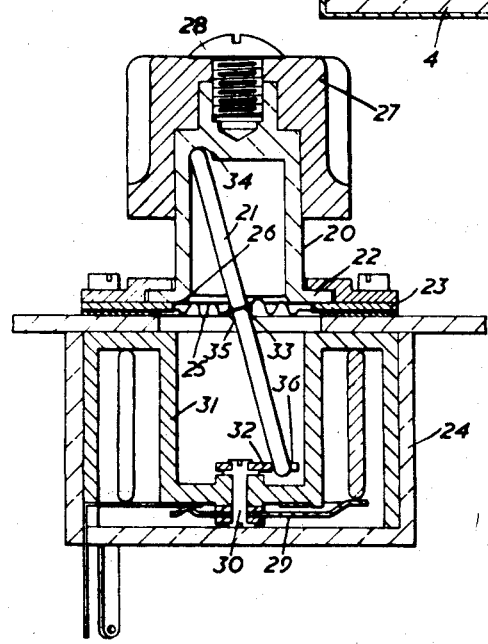
Figure 3:
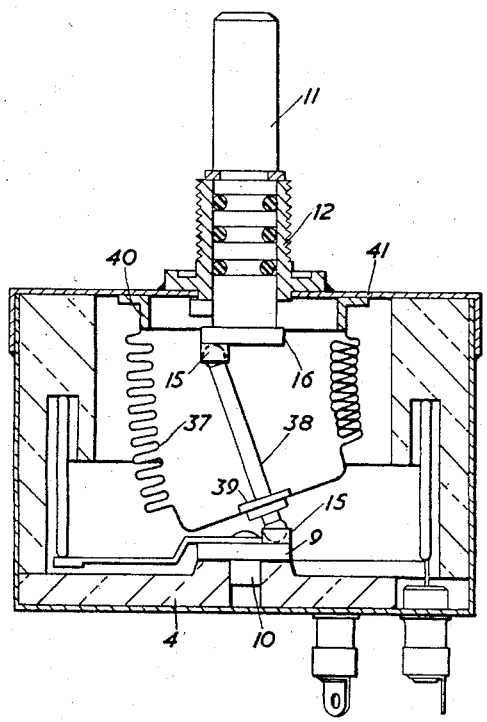

The invention as applied to a circular-track resistor or potentiometer is illustrated in the accompanying drawings in which:

Figures 1, 2 and 3 are axial sections respectively showing three different embodiments. Referring first to Figure 1, the actuated member is the movable contact 1 of a circular-track potentiometer, the track of which is indicated at 2. The potentiometer track is supported, by means of a ceramic lining 3, 4, in an airtight housing built up from a shell 5 of metal and a cover member 6 attached to the shell 5 by an airtight joint 7. The centre portion of the cover member is constituted by a flexible diaphragm 8. The movable contact member 1 is carried by a rotatable disk 9 which is mountel for rotation about the axis of a pin 10. An actuating spindle 11 is rotatably mounted in a hub portion 12 secured on a lid member 13 which is fitted over the down-turned outer edge of the cover member 6 and sealed to the latter and the shell 5 by the above-mentioned seal 7. Both the disk 9 and the spindle 11 are so mounted that while being rotatable they are secured against axial displacement away from each other. A coupling rod 14 is connected at each end by universal joints 15 to diametrically opposite points of the disk 9 and of a similar disk 16 secured at the inner end of the spindle 11, while at its centre it extends through the centre of the diaphragm 8 and bears an integral collar 17 which is secured to the centre portion of the diaphragm 8 so as to form an airtight seal therewith. The diaphragm 8 may consist of silicone rubber, in which case the device may be used at temperatures between minus 90° C. and plus 200° C. When the spindle 11 is turned to alter the setting of the potentiometer, the disk 16 will turn with it, and, due to the rigidity of the coupling rod 14, which maintains the distance between the two universal joints 15 constant, the disk 9 is forced to rotate in synchronism with the disk 16 thereby moving the movable contact 1 according to the setting of the spindle 11. During this movement the rod 14 will swivel about its centre point but will be prevented from rotation about its axis by the connection between its collar 17 and the diaphragm 8, while the universal joints 15 enable this to take place without impeding the rotation of the spindle 11 and the disk 9.

It will be seen that the actual contact between elements 1 and 2 takes place in an entirely sealed compartment free from any movable joints. The outer side of the diaphragm and the part of the actuating mechanism by which the spindle 11 is coupled to the coupling rod 14, is likewise accommodated in a fixed housing portion, the latter being sealed in a substantially air-proof manner by the provision of sealing rings 18 in the bore of the bush 19 through which the spindle 11 projects to the outer side of the housing.

In the embodiment illustrated in Figure 2 the actuating spindle 11 of Figure 1 is replaced by a hood-shaped spindle member 20, which encases the outer portion of the coupling rod 21 and has an end flange 22 by means of which it is rotatably supported on the cover plate 23 of the housing shell 24. A diaphragm 25 closes the central aperture 26 of the cover member 23, its function being similar to that of the diaphragm 8 in Figure 1. A finger knob 27 is mounted directly on the actuating member 20, on which it is secured by a screw 28. The movable contact arm 29 is coupled with a crank member 32 by an axial pin 30 rotatably mounted in a bearing member 31 inside the housing 24. The coupling rod 21, which is sealingly connected with the diaphragm 25 by a collar 33, engages with one end a recess or aperture 36 of the crank 32 and is supported with its other end in a recess 34 in the hood-shaped spindle member 20, the ends of the coupling rod 21 being rounded as shown, thus making, in their co-operation with the rounded recesses, the use of expensive universal joints unnecessary. The collar 33 may be combined with ball-type mountings 35 as symbolically indicated, which may be arranged at one or both sides of the diaphragm, in which case the crank 32 is relieved of thrust.

Figure 3 shows an embodiment which is essentially similar to that of Figure 1, but in which simplification of the housing structure has been made possible by the use of a bellows 37 for sealing off the part of the housing containing the shaft 11. The coupling rod 38 is connected to the disks 9 and 16 by ball joints 15 as in the case of Figure 1, but its integral collar 39 is arranged at the lower end of the coupling rod 38 to provide a greater length of bellows, although obviously this is not essential. The relatively complicated cover member 6 of Figure 1 is replaced by a simple angle-section ring 40, which is secured in an airtight manner to the inner surface of the top cover member 41.

What we claim is:

1. A hermetically sealed electrical control device comprising a fluid-tight container, a flexible diaphragm forming at least a part of one wall of the container, a control member first and second parts to the control member, the control member passing in fluid tight manner through the diaphragm, so that the first and second parts are on opposite sides of the diaphragm with the second part inside the container, a first rotatable member mounted, on the exterior of said container, for rotation about an axis which is transverse to and intersects the diaphragm, a first ball and socket connection between the first part of the control member and the first rotatable member, the connection being offset from said axis, a second rotatable member located inside the container, the second rotatable member being rotatable about said axis, a second ball and socket connection between the second part of the control member and the second rotatable member, the connection being so positioned relative to said axis and the first connection that the control member is inclined to and intersects the axis, a variable resistor mounted in the container, a ring-like track forming the resistive element of the resistor and a wiping contact carried by the second rotatable member contacting the resistor track, the resistor track being so positioned that the second part lies substantially wholly inside the resistance track.

2. A hermetically sealed electrical control device comprising a fluid-tight cylindrical container, a flexible diaphragm forming at least a part of one end wall of the container, a control member, first and second parts to the control member, the control member passing in fluid-tight manner through the diaphragm so that the first and second parts are on opposite sides of the diaphragm with the second part inside the container, a first rotatable member, mounted on the exterior of said container, for rotation about an axis which is transverse to and intersects the diaphragm the first rotatable member being constituted by a hollow operating head, which substantially wholly surrounds the first part, a first ball and socket connection between the first part of the control member and the first rotatable member, the connection being offset from said axis, a second rotatable member located inside the container, the second rotatable member being rotatable about said axis, a second ball and socket connection between said second part and the second rotatable member, the second connection being so positioned relative to said axis and to the first connection that the control member is inclined to and intersects the axis, a variable resistor mounted on the housing, a cylindrical resistance element in said resistor and a wiping contact carried by the second rotatable member contacting the resistor element, the resistor element being so positioned and dimensioned that it substantially surrounds the second part of the control member and the second rotatable member.

References Cited in the file of this patent

UNITED STATES PATENTS

| | | |
|---|---|---|
| 2,454,340 | Reichel | Nov. 23, 1948 |
| 2,469,105 | De Giers | May 3, 1949 |
| 2,551,793 | De Giers et al. | May 8, 1951 |

FOREIGN PATENTS

| | | |
|---|---|---|
| 555,879 | Great Britain | Sept. 10, 1943 |